US000001479H

United States Statutory Invention Registration [19]

[11] Reg. Number: H1479

Paulonis et al. [43] Published: Sep. 5, 1995

[54] LIQUID COMPOSITION ANALYZER AND METHOD

[75] Inventors: Michael A. Paulonis, Kingsport, Tenn.; Debasish Mondal, Macon, Ga.; Aravamuthan Krishnagopalan, Auburn, Ala.

[73] Assignees: Auburn University; Auburn Research Foundation, both of Ala.

[21] Appl. No.: 881,327

[22] Filed: May 7, 1992

Related U.S. Application Data

[63] Continuation of Ser. No. 517,216, May 1, 1990, abandoned.

[51] Int. Cl.[6] ..... G01N 27/00

[52] U.S. Cl. ..... 422/82.02; 422/82.01; 436/150

[58] Field of Search ..... 422/82.01, 82.02, 82.03, 422/82.05, 76, 77, 107, 111; 436/150, 179, 805, 806; 162/49

[56] References Cited

U.S. PATENT DOCUMENTS

| | | | |
|---|---|---|---|
| 3,250,118 | 5/1966 | Johnson, Jr. | 422/82.03 X |
| 3,941,649 | 3/1976 | Wallin | 162/19 |
| 4,236,960 | 12/1980 | Hultman et al. | 162/30 K |
| 4,276,119 | 6/1981 | Karnis et al. | 162/49 |
| 4,536,253 | 8/1985 | Bertelsen | 162/30.1 |
| 4,717,672 | 1/1988 | Fleming et al. | 436/55 |
| 4,718,979 | 1/1988 | Tikka et al. | 162/49 |
| 4,838,999 | 6/1989 | Haar et al. | 422/82.03 X |
| 4,895,618 | 1/1990 | Tikka et al. | 436/179 |

OTHER PUBLICATIONS

Kemotron A/S—Sales Brochure.

*Primary Examiner*—Gary L. Geist
*Assistant Examiner*—Joseph D. Anthony
*Attorney, Agent, or Firm*—Kinney & Lange

[57] ABSTRACT

An apparatus which determines concentrations of each of three components that are intermixed in a homogeneous solution. Each component is detectable by at least one characteristic and more than one characteristic is associated with more than one component. First, characteristics that are quantitatively detectable in relation to the concentrations of the components are identified. A mathematical relationship is then developed between the components and the detectable characteristics using the detectable characteristics as independent variables. A sample of the solution is then analyzed to obtain quantitative data of each of the characteristics. The obtained quantitative data is then employed in the mathematical relationship to obtain the concentration of each of the components.

6 Claims, 12 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LIQUID COMPOSITION ANALYZER AND METHOD

This is a continuation of application Ser. No. 07/517,216 filed on May 1, 1990, abandoned as of the date of this application.

BACKGROUND OF THE INVENTION

Accurate knowledge of white and green liquor composition is necessary for close control of kraft pulping and recausticizing operations. First, if changes in the green liquor composition can be monitored, feed forward control of the lime feed rate in the causticizing plant can be achieved. Second, compositional information of the white liquor can be used as feedback to compensate for variations in the lime quality or reactivity, and as feed forward compensation for pulping.

In the past, white and green liquor compositions have been determined by laboratory titrations. However, both the analysis rate and the accuracy of routine titrations are not sufficient to take full advantage of modern control systems and strategies.

The Wallin U.S. Pat, No. 3,941,649 describes an attempt to control the pulping time and pulping temperature by taking a sample of the pulping liquor after initial digestion has occurred. The pulping sample is titrated to provide an alkaline content of the liquor. From this alkaline content, the pulping intensity expressed as "H" factor is determined and used to obtain the desired KAPPA number.

The Hultman et al U.S. Pat. No. 4,236,960 describes a process for controlling the degree of causticization of white liquor. The process of the Hultman et al patent includes determining the sodium carbonate concentration of green liquor fed to the causticization, then determining the sodium carbonate concentration of white liquor resulting from the causticization and thereby controlling the degree of causticization within a predetermined range while taking both sodium carbonate concentrations into account.

The Bertelsen U.S. Pat. No. 4,536,253 describes a process for controlling the properties of white liquor by measuring the electric conductivity of the green liquor before causticization in addition to measuring of the conductivity of the white liquor. The conductivity of the green liquor is measured both before the slaker and gradually as it passes through the slaker to determine the reaction of the carbonate.

SUMMARY OF THE INVENTION

The present invention includes a method for determining the concentration of each of at least three components intermixed in a homogeneous solution. For example, in the case of the kraft pulping or recausticizing operations, the white or green liquor composition includes three major components, sodium hydroxide, sodium sulfide, and sodium carbonate.

The method includes identifying characteristics of the components that are quantitatively detectable in relation to the concentration of the components. A mathematical relationship is then developed between the concentration of each of the components and the detectable characteristics using the characteristics as independent variables. The solution is then sensed using detectors to obtain quantitative data for each of the characteristics. The quantitative data is then employed in the mathematical relationship to obtain the concentration of each of the components.

The present invention also includes an analyzer having detectors which sense the three components and provide quantifiable data to a computer for employment in the mathematical relationship that was developed. In one preferred mode, a sample is extracted from the process and analyzed by the detectors. In another preferred mode, the process solution is continuously passed by the detectors for analysis.

DETAILED DESCRIPTION OF THE PREFERRED EMBODIMENTS

In a preferred embodiment, the present invention includes an on-line automatic liquor analyzer for a kraft pulp-paper mill application. Timely knowledge of liquor composition is necessary for close control of the digesting and recovery operations in a pulping process. Although the process described herein is a kraft (alkali based) process, the analyzer of the present invention may very well be used in other processes such as a sulfite process.

In a kraft pulping operation, the three primary components of the liquor include sodium hydroxide, sodium sulfide, and sodium carbonate. The present invention provides a non-invasive type of measurement of the green liquor (the liquor exiting the recovery furnace) or the white liquor (the liquor exiting the causticizer) or green, white, or weak liquor solutions in other parts of the process can also be measured. Detectors are chosen for sensing a characteristic of each of the components. For example, in one of the preferred embodiments, UV absorption at 254 nm was used to detect sodium sulfide which hydrolyzes into sodium hydrosulfide in kraft liquors. Conductivity and refractive index were used to detect sodium hydroxide, sodium sulfide, and sodium carbonate in differing proportions.

The present invention also includes a process for obtaining the concentrations of components of a process solution by initially identifying the characteristics of the components that are quantitatively detectable in relation to the concentration of the component. A mathematical technique such as regression analysis is used to develop a mathematical relationship between the relative concentration of the components and the detectable characteristics. For example, equations are developed using the detectable characteristics as independent variables. A sample of the solution is then analyzed to obtain quantitative data for each of the detectable characteristics. That quantitative data is then employed in the mathematical relationship developed previously to obtain the concentration of each of the components in the sample.

Using the analyzer of the present invention, white or green liquor is drawn without interrupting the process or contaminating the process solution. Since a sample can be taken at any time and an analysis done quickly, for example in less than three minutes, the present invention provides for close monitoring of the process that was previously not possible.

The analyzer of the present invention can be used in at least one of two preferred modes. In a first mode, a sample is extracted from the process and analyzed. In a second mode, the process solution is continuously passed by the detectors.

EXTRACTIVE SAMPLE ANALYZER

ANALYZER DESIGN

Figure 1:
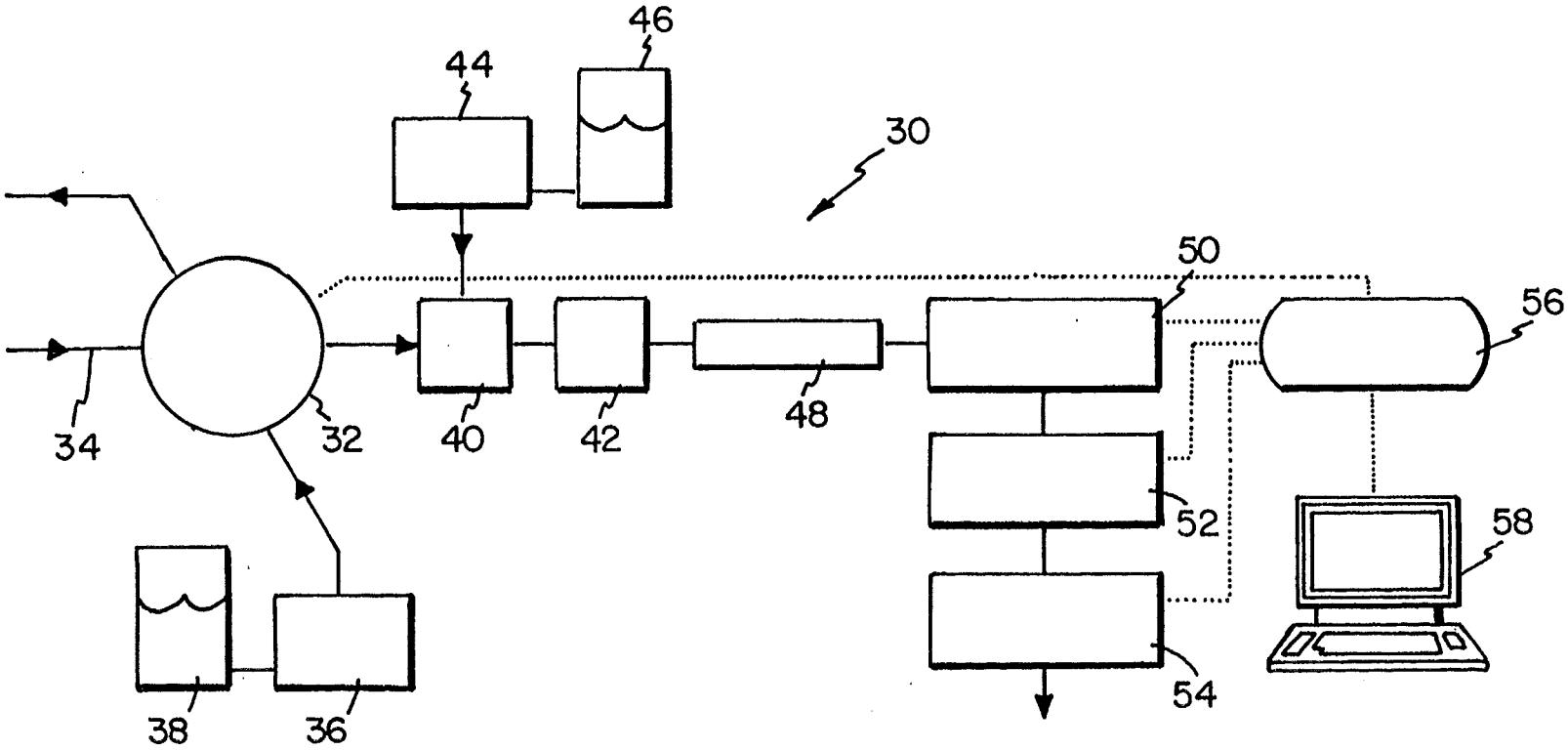
FIG. 1 is a schematic diagram of a liquid analyzer of the present invention.

The extractive sample analyzer 30 is illustrated in FIG. 1. The analyzer 30 includes a Valco EC6W 6-port sample injection valve with electric actuator 32 for extracting a sample from a sample stream at 34 from the process of the present invention. A Waters 510 HPLC pump 36 is used to pump water 38 into the valve 32. A Waters zero dead volume tee 40 is disposed upstream from a Waters high pressure gradient mixer 42. A Waters 510 HPLC pump 44 pumps water 46 through the tee 40. A Waters column heater 48 is disposed downstream from the mixer for maintaining a selected temperature of the extracted sample. Located downstream from the heater are a Waters 481 variable wavelength UV spectrophotometer 50, a Waters 430 enhanced conductivity detector 52, and a Waters 410 differential refractometer 54. Data from the three detectors 50, 52, and 54 is collected by a Keithley 570 data acquisition system 56 and a Zenith 248 microcomputer 58.

The operation of the analyzer proceeds as follows. A liquor stream is run through the extractive valve 32 and a very small sample (5 microliters) is captured in a constant volume loop in the valve 32. The sample is flushed from the valve 32 by a stream of distilled, degassed water 38 provided by pump 36. The flowing sample is diluted by additional distilled, degassed water 46 entering through the tee 40. The resulting sample is mixed thoroughly in the gradient mixer 42. The mixed sample is heated to a uniform temperature by passing through the column heater 48. The sample then flows through the UV spectrophotometer 50, conductivity detector 52, and differential refractometer 54. The responses from the detectors are sent to the computer 58 by the data acquisition system 56 where the responses are integrated over time. The areas are calculated by the computer in units of volt-sec $\times 10$. The concentrations of sodium hydroxide, sodium sulfide, and sodium carbonate in the liquor are then calculated by correlations with the detector response areas.

ANALYZER OPERATION

Experiments were carried out with aqueous solutions containing sodium hydroxide, sodium sulfide, and sodium carbonate, the three major components in most kraft pulp mill liquors. The experiments were divided into two groups, white liquor type solutions and green liquor solutions. The white liquor solutions containing between 60 and 120 g/l of NaOH, 10 to 40 g/l $Na_2S$, and 0 to 40 g/l of $Na_2CO_3$, all expressed as $Na_2O$ equivalents. The green liquor solutions contained between 60 and 120 g/l of $Na_2CO_3$, 0 to 40 g/l of NaOH, and 0 to 40 g/l $Na_2S$, all expressed as $Na_2O$ equivalents.

The test solutions were prepared from concentrated stock solutions of the individual compounds. The stock solutions were prepared in distilled, degassed water, using reagent grade chemicals. These solutions were kept tightly capped and the runs were made within 10 days of stock solution preparation. The concentrations of the stock solutions were determined by titration with HCl. The solution densities were determined by weighing known volumes. The concentration and density of each solution were periodically checked and no changes were detected during the course of the experiments.

The test solutions were prepared by mixing specific masses of the stock solutions and water, if necessary, to produce the desired concentration of each component. The solutions were injected into the analyzer 30 immediately after preparation to minimize any compositional changes due to sulfide oxidation, carbonate formation, or evaporation.

The operating parameters for the analyzer components are listed in Table 1. The inputs to the data acquisition system were carried by twisted, shielded pairs, and filtered by first-order RC filters with a 2.7 K ohm resistor and a 10 $\mu$F non-polar capacitor.

TABLE 1

Operating Parameters for the Extractive Sample White and Green Liquor Analyzer Components

| | | |
|---|---|---|
| Pumps: | Sample flow = | 0.1 ml/min |
| | Dilution flow = | 5.0 ml/min |
| Heater: | Temperature = | 30.0° C. |
| UV detector: | Wavelength = | 254 nm |
| | Time constant = | 1 sec. |
| | Output = | 1V/AU |
| Conductivity: | Output = | 2V/mS |
| detector | Temperature control on | |
| Refractometer: | Time constant = | 1 sec. |
| | Sensitivity = | 64 |
| | Scale factor = | 20 |
| | Temperature = | 32.0° C. |

Figure 2:
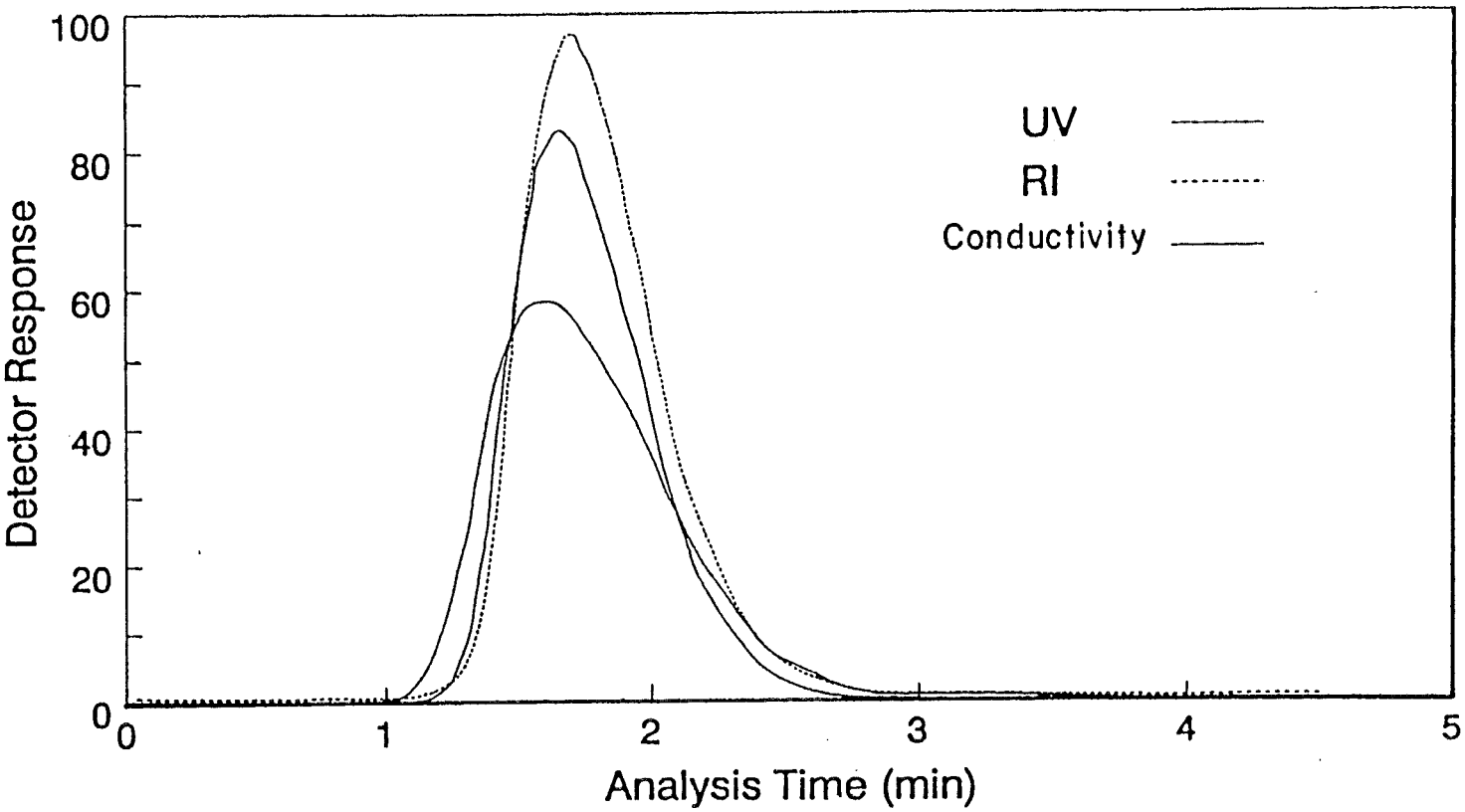
FIG. 2 is a graphical view of a typical response of the analyzer of FIG. 1 to a kraft liquor.

After the sample injection, the detector responses were recorded for five minutes by the data acquisition system. A sample response is illustrated in FIG. 2. The response shows a dead time of just over one minute, where the sample zone was traveling from the injection valve to the tee. The analysis was run for over a minute after the responses returned to the baseline although this additional time is not necessary. Thus, the minimum analysis time per sample is approximately three minutes.

ANALYZER CALIBRATION

For white liquor type solutions, 21 experimental runs were made to establish correlations for the individual components. The concentration of each component and the detector response areas were recorded for each run. The data was analyzed in two ways. First, the concentrations were taken as the independent variables to give an indication of how the liquor component concentrations affect the detector responses.

Stepwise multiple linear regression was used to determine the best combination of factors to describe the detector output. The results for white liquor indicate:

$$RI=4.5459\ OH+5.8751\ S+4.9818\ C+4.4202 \quad (1)$$

$$UV=19.0756\ S-0.1311\ S^2+0.1586\ OH+11.1899 \quad (2)$$

$$CO=15.9066\ OH-0.0120\ OH^2+10.5559\ S+7.2305\ C+50.0796 \quad (3)$$

where

RI=differential refractometer response

UV=UV spectrophotometer response

CO=conductivity detector response

OH=sodium hydroxide concentration (g/l $Na_2O$)

S=sodium sulfide concentration (g/l $Na_2O$)

C=sodium carbonate concentration (g/l $Na_2O$) The standard deviations for the predictions are: RI=1.28, UV=3.97, and CO=4.74 area units. The coefficients of variation for each detector response are: RI=0.23%, UV=1.05%, and CO=0.32%. These values are very close to the repeatability deviations of each detector response as determined by multiple tests of the same solution. The repeatability limits are approximately: RI=±1, UV=±3, and CO=±4 units.

This analysis indicates that the error in the predicted responses is primarily due to random errors introduced by the analyzer, including injection volume differences, carrier flow fluctuations, detector response variations, and data acquisition noise. This conclusion is verified by regression residual analysis which shows no residual pattern with respect to the solution concentrations or test order.

For the purpose of concentration prediction, a more useful regression involves the use of detector responses as independent variables. In this way, the solution composition could be calculated directly from the detector responses. Stepwise multiple linear regression produces the following equations:

$$OH=0.1163\ CO+4.721\times10^{-6}\ CO^2-0.1882\ RI-0.02067\ UV-1.210 \quad (4)$$

$$S=0.02955\ UV+6.487\times10^{-5}\ UV^2-2.882\times10^{-7}\ CO^2+2.113 \quad (5)$$

$$C=0.364784\ RI-0.1079\ CO-2.923\times10^{-6}\ CO^2-0.02529\ UV-6.354\times10^{-5}\ UV^2+1.614 \quad (6)$$

The standard deviations for the predictions are: OH=0.35, S=0.37, and C=0.60. Equations (4, 5, and 6) result in an approximate 90% confidence interval of ±0.5 g/l for both sodium hydroxide and sodium sulfide, and ±0.8 g/l for sodium carbonate.

These correlations were entered into the computer data acquisition system in order to calculate component concentrations for subsequent trials. A set of four additional samples were run as a test set to check the prediction capability. The predictions were also compared with values obtained by manual titration of the samples. The results are shown in Table 2. The results verify the error limits as predicted by the regression analysis.

TABLE 2

Comparison of Extractive Sample Analyzer Results with Titration Results for Synthetic White Liquor Solutions

| Test No. | Component | Actual Conc. | Analyzer Conc. | Titration Conc. |
|---|---|---|---|---|
| 1 | Sodium Hydroxide | 79.9 | 79.9 | 79.2 |
| | Sodium Sulfide | 27.5 | 27.8 | 27.4 |
| | Sodium Carbonate | 32.8 | 32.7 | 32.9 |
| 2 | Sodium Hydroxide | 56.7 | 56.7 | 56.7 |
| | Sodium Sulfide | 13.8 | 13.9 | 13.4 |
| | Sodium Carbonate | 30.9 | 30.8 | 30.9 |
| 3 | Sodium Hydroxide | 40.4 | 40.1 | 40.4 |
| | Sodium Sulfide | 20.8 | 20.8 | 20.3 |
| | Sodium Carbonate | 23.7 | 23.6 | 23.9 |
| 4 | Sodium Hydroxide | 98.5 | 99.1 | 99.0 |
| | Sodium Sulfide | 41.1 | 41.5 | 40.0 |
| | Sodium Carbonate | 0.0 | 0.0 | 0.6 |

NOTE: all concentrations in g/l as $Na_2O$

A similar set of experiments was run for green liquor type solutions. In this case, 23 experiments were run to establish correlations. The regression using concentrations as independent variables yielded the following equations:

$$RI=4.869\ OH-6.873\times10^{-3}\ OH^2+5.857\ S+4.910\ C+3.821 \quad (7)$$

$$UV=20.483\ S-0.1519\ S^2+0.1576\ C-9.533 \quad (8)$$

$$CO=13.680\ OH+10.266\ S+6.813\ C+3.080\times10^{-3}+134.665 \quad (9)$$

The standard deviations for the predictions are: RI=1.71, UV=4.30, and CO=3.32 units. The coefficients of variation are: RI=0.27%, UV=1.28%, and CO=0.28%. These errors are again close to the analyzer repeatability error. It should be noted that equations (7, 8, and 9) are not exactly the same as equations (1, 2, and 3) for white liquor but are very similar. Much of the observed differences can be attributed to interactions between the liquor components which can cause nonlinearities in detector responses both white and green liquor samples.

The regression with detector responses as the independent variables produces:

$$OH=0.1483\ CO-0.2219\ RI-0.01069\ UV-8.050\times10^{-6}\ UV^2-15.513 \quad (10)$$

$$S=0.04006\ UV=4.923\times10^{-5}UV^2-1.893\times10^{-6}RI^2+0.6781 \quad (11)$$

$$C=0.4180\ RI-0.1415\ CO-0.03506\ UV-5.538\times10^{-5}UV^2+12.106 \quad (12)$$

The standard deviations for these predictions are: OH=0.35, S=0.37, and C=0.54. This gives approximate confidence intervals of ±0.5 g/l for sodium hydroxide and sodium sulfide and ±0.7 g/l for sodium carbonate. These prediction errors are similar to those for white liquor, as would be expected since the basic equations are very similar.

Analyses were conducted on four additional samples as a test set to check these correlations. The samples were also manually titrated to compare with the predictions. The results are shown in Table 3. As with the white liquor, the results are excellent, with the analyzer error less than the predicted error bounds.

TABLE 3

Comparison of Extractive Sample Analyzer Results with Titration Results for Synthetic Green Liquor Solutions

| Test No. | Component | Actual Conc. | Analyzer Conc. | Titration Conc. |
|---|---|---|---|---|
| 1 | Sodium Sulfide | 10.4 | 10.1 | 10.2 |
| | Sodium Carbonate | 115.9 | 116.1 | 116.4 |
| | Sodium Hydroxide | 30.0 | 29.9 | 30.2 |
| 2 | Sodium Sulfide | 0.0 | 0.3 | 0.0 |
| | Sodium Carbonate | 78.9 | 78.4 | 78.9 |
| | Sodium Hydroxide | 9.9 | 9.9 | 9.8 |
| 3 | Sodium Sulfide | 24.9 | 25.1 | 24.7 |
| | Sodium Carbonate | 86.3 | 86.2 | 86.6 |
| | Sodium Hydroxide | 21.7 | 22.0 | 21.5 |
| 4 | Sodium Sulfide | 15.3 | 15.3 | 15.2 |
| | Sodium Carbonate | 94.2 | 94.6 | 94.3 |

NOTE: all concentrations in g/l as $Na_2O$

The results show that the analyzer works well for white and green liquor type samples prepared from pure chemicals. It is expected that the responses would change if other compounds were present in the liquor. In industrial white and green liquor, there could be trace amounts of sodium sulfate, sodium sulfite, sodium thiosulfate, and polysulfide sulfur. The detector response to these impurities was tested by injecting solutions containing these contaminants into the analyzer. The results are shown in Table 4. The data indicates that in each case the presence of impurities will add area to each of the detector responses of a pure liquor. Thus, for industrial use, the analyzer must be calibrated to accommodate the concentration of impurities in the liquor. In all cases with kraft liquors, the impurities will be present in only minor amounts and will be present at nearly constant levels.

TABLE 4

Effect of White and Green Liquor Impurities on Extractive Sample Analyzer Detector Responses

| Compound | Concentration (g/l as $Na_2O$) | UV Area | RI Area | Cond Area |
|---|---|---|---|---|
| $Na_2S_2O_3$ | 10.5 | 42.7 | 69.7 | 90.7 |
| $Na_2SO_3$ | 9.6 | 5.3 | 53.0 | 73.5 |
| $Na_2SO_4$ | 10.0 | 0.2 | 46.3 | 82.1 |

TESTS WITH INDUSTRIAL

Kraft Liquors

Analyses were performed on various white and green liquors obtained from kraft mills. The object of the tests was to determine the effect of actual mill liquor impurities on the analyzer results. Ten white and green liquor samples were analyzed.

Figure 3:
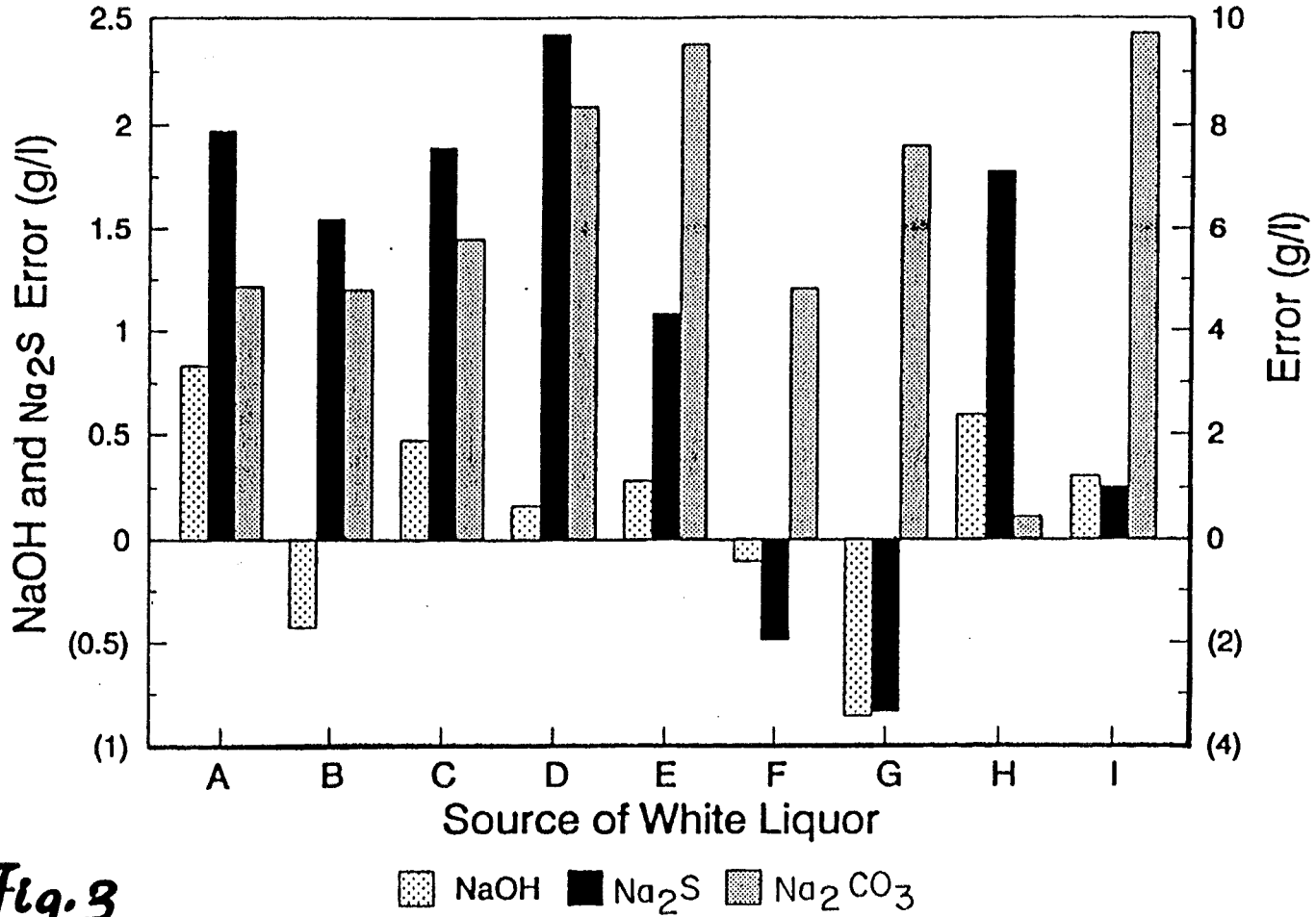
FIG. 3 is a graphical view illustrating deviations between titrated and predicted industrial white liquor compositions using the analyzer of FIG. 1.

The results from the industrial white liquor analysis are shown in FIG. 3. The results indicate that each component is generally overpredicted when using the correlations developed for pure white liquor. The sodium hydroxide estimate is the least affected by the impurities. The observed deviations are reasonable considering the types of impurities which may be present. Some thiosulfates and polysulfides may be present which would contribute to the absorbance at 254 nm. This would result in overprediction of sodium sulfide. Sodium sulfate and sulfite would basically appear to the detectors as sodium carbonate. Sodium sulfate and sulfide are species with low conductivity contribution, but significant refractive index contribution. The average deviations for the industrial white liquors are shown in Table 5.

TABLE 5

Analysis Errors for Industrial White Liquors Using the Extractive Sample Liquor Analyzer

| Component | Avg. Error | Std. Deviation |
|---|---|---|
| Sodium Hydroxide | 0.14 g/l | 0.50 g/l |
| Sodium Sulfide | 1.07 g/l | 1.10 g/l |
| Sodium Carbonate | 6.21 g/l | 2.77 g/l |

Figure 4:
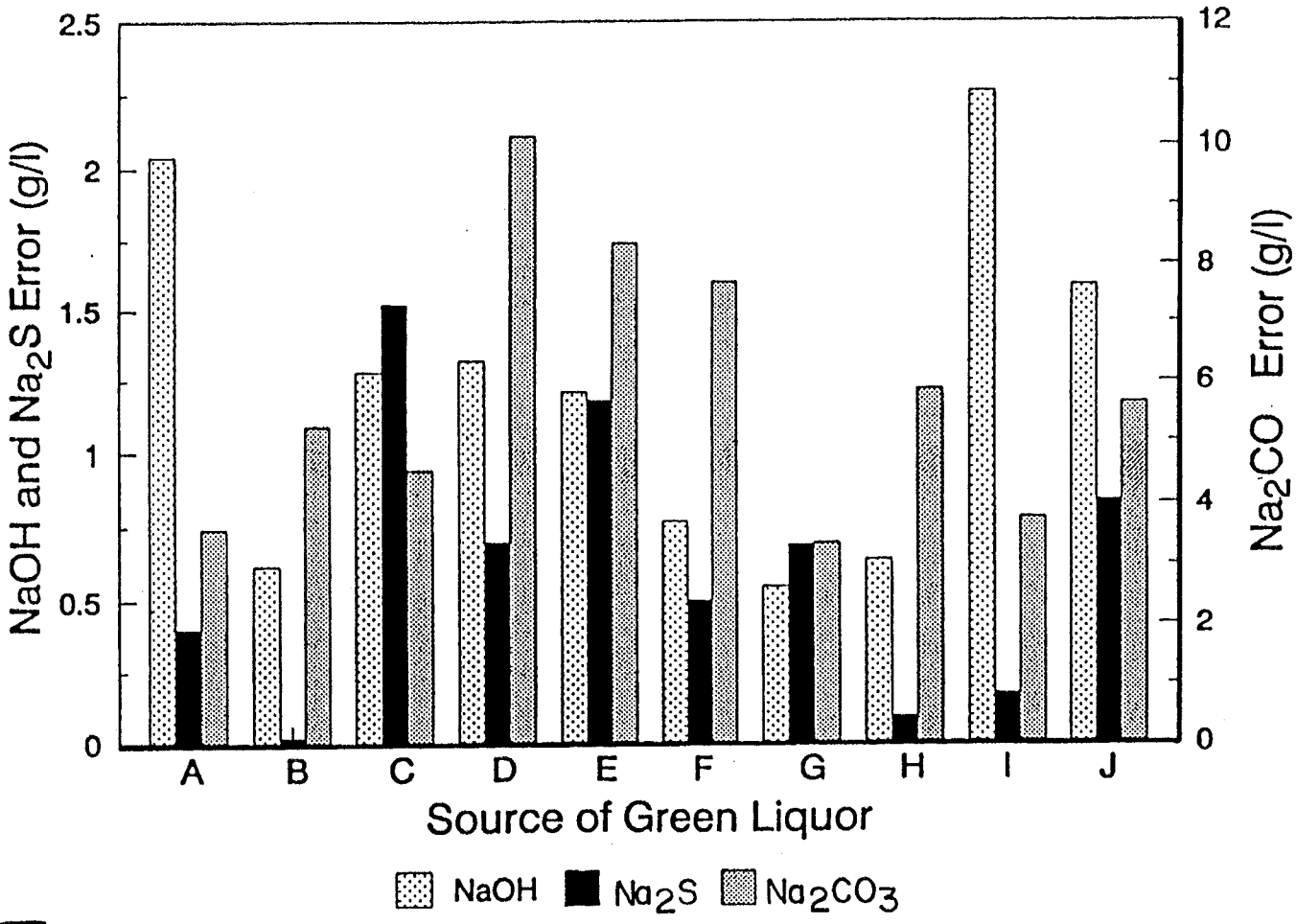
FIG. 4 is a graphical view of the deviations between titrated and predicted industrial green liquor compositions using the analyzer of FIG. 1.

The results from the industrial green liquor analyses are shown in FIG. 4. The results are similar to the industrial white liquor analysis. The sodium carbonate is always overpredicted. This is again caused by the influence of impurities having small contributions to solution conductivity. The sodium sulfide error is smaller, and the sodium hydroxide error is larger than that of the white liquor. The average deviations for industrial green liquors are shown in Table 6.

TABLE 6

Analysis Errors for Industrial Green Liquor Using the Extractive Sample Liquor Analyzer

| Component | Avg. Error | Std. Deviation |
|---|---|---|
| Sodium Hydroxide | 1.23 g/l | 0.57 g/l |
| Sodium Sulfide | 0.61 g/l | 0.46 g/l |
| Sodium Carbonate | 5.81 g/l | 2.15 g/l |

IN-SITU ANALYZER

Analyzer Design

Figure 5:
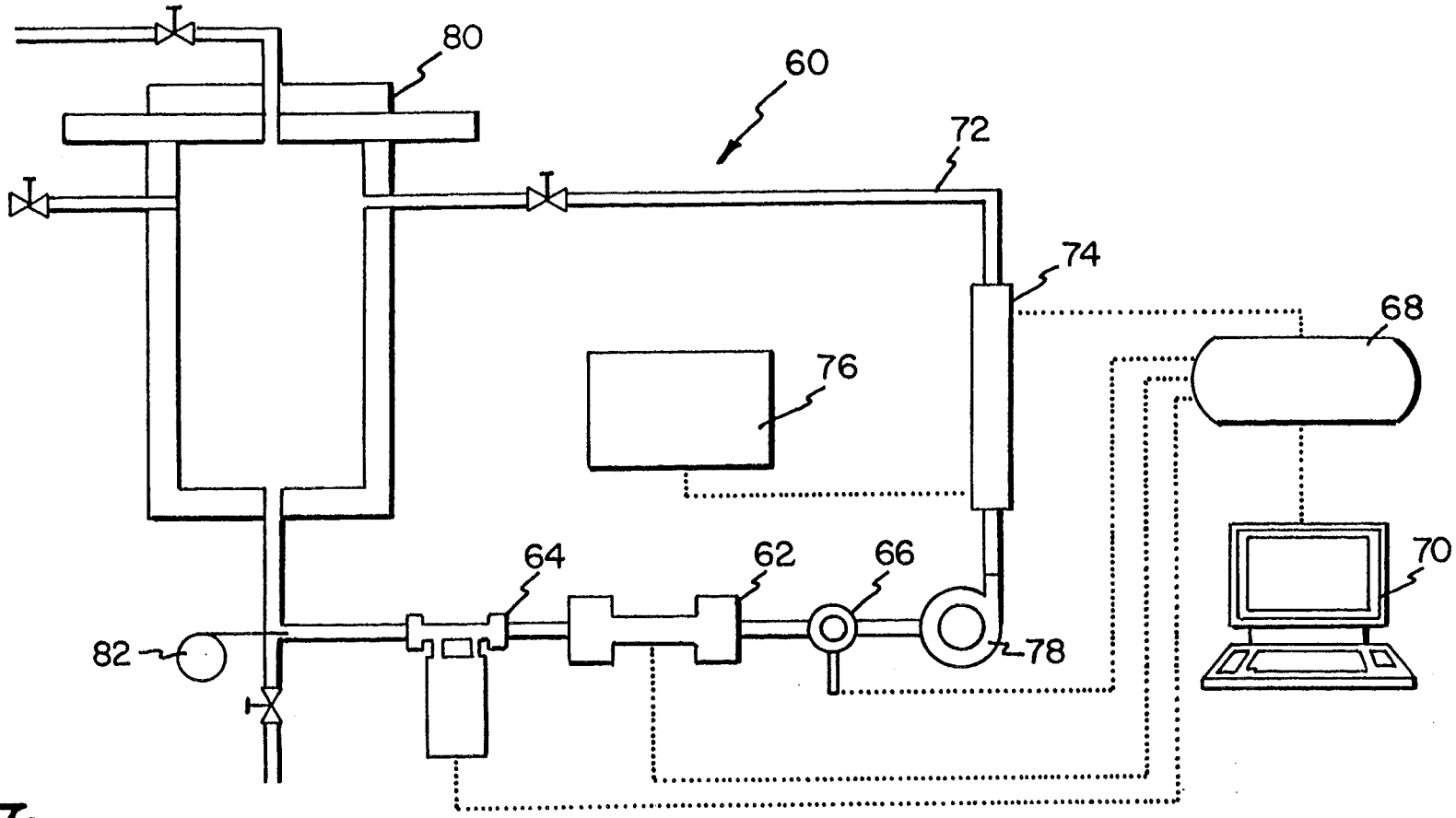
FIG. 5 is a schematic diagram of an alternative embodiment of the liquor analyzer of the present invention.

A schematic diagram of the in-situ analyzer 60 is illustrated in FIG. 5. The analyzer 60 includes a Rosemount Model 222 Toroidal Conductivity Sensor with a Model 1054T Toroidal Conductivity Analyzer/Transmitter 62, a Micro Motion Model D25 Mass Flow Meter with a Micro Motion DMS Liquid Densitometer 64, and a Rosemount Model 340A Selective Ion Sensor with a Model 1033 Selective Ion Analyzer/Transmitter with a Phoenix Silver/Sulfide Ion Electrode 66. Temperature data was transmitted through a Rosemount Series 78S platinum RTD with a Model 444 Temperature Transmitter 82. Data acquisition was accomplished with a Keithley 570 data acquisition system 68 and a Zenith 248 microcomputer 70. The conductivity sensor 62, the densitometer 64 and the sulfide electrode 66 are disposed serially along a bypass conduit 72 that provides a stream of liquor from a vessel 80. The bypass stream 72 is maintained at a uniform temperature by a heater 74 with temperature control 76. A pump 78 provides the mode of force for circulating the bypass stream 72.

The analyzer operation involves pumping the liquor through the various sensors and processing the sensor data to calculate liquor composition.

ANALYZER OPERATION

Experiments were carried out with aqueous solutions containing sodium hydroxide, sodium sulfide, and sodium carbonate. The experiments were divided into two groups, white liquor type solutions and green liquor type solutions. The white liquor solutions contained between 50 and 100 g/l of NaOH, 50 to 40 g/l of $Na_2S$, and 0 to 25 g/l of $Na_2Co_3$, all expressed as $Na_2O$ equivalents. The green liquor solutions contained between 65 and 105 g/l of $Na_2CO_3$, 0 to 30 g/l of NaOH, and 5 to 35 g/l of $Na_2S$, all expressed as $Na_2O$ equivalents.

The solutions were prepared from reagent grade chemicals in distilled water and were used immediately after preparation. A liquor sample was taken from the vessel 74 and titrated in duplicate using HCl before each experiment was begun. The vessel 80 was capped and the contents heated sequentially to 70°, 80°, and 90° C. This temperature range was chosen because it is the typical temperature range in which white and green liquors are transported throughout a pulp mill. The liquor was held at each temperature until all of the sensor responses had stabilized. In each case, the sulfide electrode had the slowest, and thus limiting, response time. Sensor data was recorded at ten second intervals throughout each experiment as averages of ten consecutive readings. The data acquisition rate was 3.33 Hz.

The process transmitters were configured to provide good signal resolution over the expected range of liquor concentrations. Each transmitter output was connected to the data acquisition system as a 4–20 mA current loop. A load resistor of 250 ohms was used to convert the signal into a voltage of 1–5 V. The transmitter ranges and maximum signal resolutions are shown in Table 7.

TABLE 7

In-Situ Liquor Analyzer Sensor Configurations and Maximum Signal Resolutions.

| Sensor | Range | Max. Resolution |
|---|---|---|
| Temperature | 0–210° C. | 0.13° C. |
| Conductivity | 0–1000 mS/cm | 0.61 mS/cm |
| Density | 950–1150 g/l | 0.12 g/l |
| Sulfide Ion | 730–880 mV | 0.09 mV |

ANALYZER CALIBRATION

For white liquor type solutions, 15 experimental runs were made to establish correlations for the individual components. The data consisted of the concentration of each component and the sensor readings at each temperature level.

The procedure for reducing the data into correlations involved two steps. First, the temperature effect on the detector responses was determined. This allowed the final regression to be made on temperature compensated data. This approach was chosen based on the eventual field application of the analyzer. In the field, the temperature compensation could possibly be performed prior to data transmission.

Examination of the white liquor data indicates that the temperature effect on both density and conductivity is approximately linear over the range 70°–90° C. The values at 80° C. were used as the reference values. The data at other temperatures were adjusted to the reference. The linear slope relating density divided by reference density to temperature took on values between $-4.6\times10^{-4}$ and $-5.4\times10^{-4}$° C.$^{-1}$. The slope was found to be a linear function of the reference density. The regression equation is:

$$D_r = \frac{D_T}{[m\,D_r + n](T - 80) + 1} \tag{13}$$

where t=temperature (C)

$D_T$=density at temperature T (g/l)

$D_r$=density at reference temperature (g/l)

$m=3.9752\times10^{-4}$ $n=-9.3618\times10^{-4}$

This relationship can be expressed as a quadratic equation in $D_r$. Thus, $D_r$ can be solved for explicitly using the quadratic formula:

$$D_r = \frac{-b + \sqrt{(b^2 - 4ac)}}{2a} \tag{14}$$

where a=m (T−80)

b=n (T−80)+1

$c=-D_T$

The conductivity divided by reference conductivity data exhibited slopes between $8.6\times10^{-3}$ to $11.5\times10^{-3}$° C.$^{-1}$ which were also a linear function of the reference density. Since the reference density can be calculated by equation (14), the regression equation is:

$$C_r = \frac{C_T}{[m\,D_r + n](T - 80) + 1} \tag{15}$$

where

T=temperature (C)

$C_T$=conductivity at temperature T (mS/cm)

$C_r$=conductivity at reference temperature (mS/cm)

$m=2.9106\times10^{-5}$ $n=-2.2055\times10^{-2}$

The liquor temperature is not a significant factor in the sulfide electrode response for the white liquor solutions in the range of 70°–90° C. The data indicates that there is a small deviation of the electrode response within this region, but no trend was observed with temperature.

The complete set of data adjusted to the reference temperature was analyzed using stepwise multiple linear regression to obtain best regression equations for the component concentrations. The relationship between sulfide concentration and sulfide electrode voltage is logarithmic:

$$V = V_o + B\,ln(X) \tag{16}$$

where

V=sulfide electrode voltage (mV)

$V_o$=reference potential (mV)

B=electrode slop (mV/decade)

X=sulfide activity (M)

The activity coefficient relating the activity and the concentration is dependent upon the total ionic strength of the liquor being measured. This indicates that additional terms involving the other components in the liquor may be required to adequately fit the electrode response to measured sulfide concentration. The best regression equations for sulfide concentration in the white liquor composition range are:

$$ln(S) = -40.2719 + 4.7718\times10^{-2}\,V + 9.5084\times10^{-3}\,C_r - 6.8623\times10^{-6}\,C_r^2 \tag{17}$$

where

S=sodium sulfide concentration (g/l $Na_2O$)

V=sulfide electrode voltage (−mV)

$C_r$=reference conductivity (mS/cm)

and $$ln(S) = -39.1853 + 4.6918\times10^{-2}\,V + 8.3142\times10^{-3}\,C_r - 6.0181\times10^{-6}\,C_r^2 \tag{18}$$

Equation (17) is the best fit for liquor only at 80° C., equation (18) is best for the temperature range 70°-90° C.

These correlations indicate that the basic relationship between electrode voltage and sulfide concentration is exponential with some correction for ionic strength effects. The choice of conductivity for ionic strength correction was made by examination of residuals obtained by fitting only the electrode voltage. The conductivity showed a clear trend with the residuals. The sodium hydroxide ion concentration also showed a trend, but it is not a measured variable. No other correction term, including sodium hydroxide, provided a significant regression improvement after conductivity was included.

Figure 6:
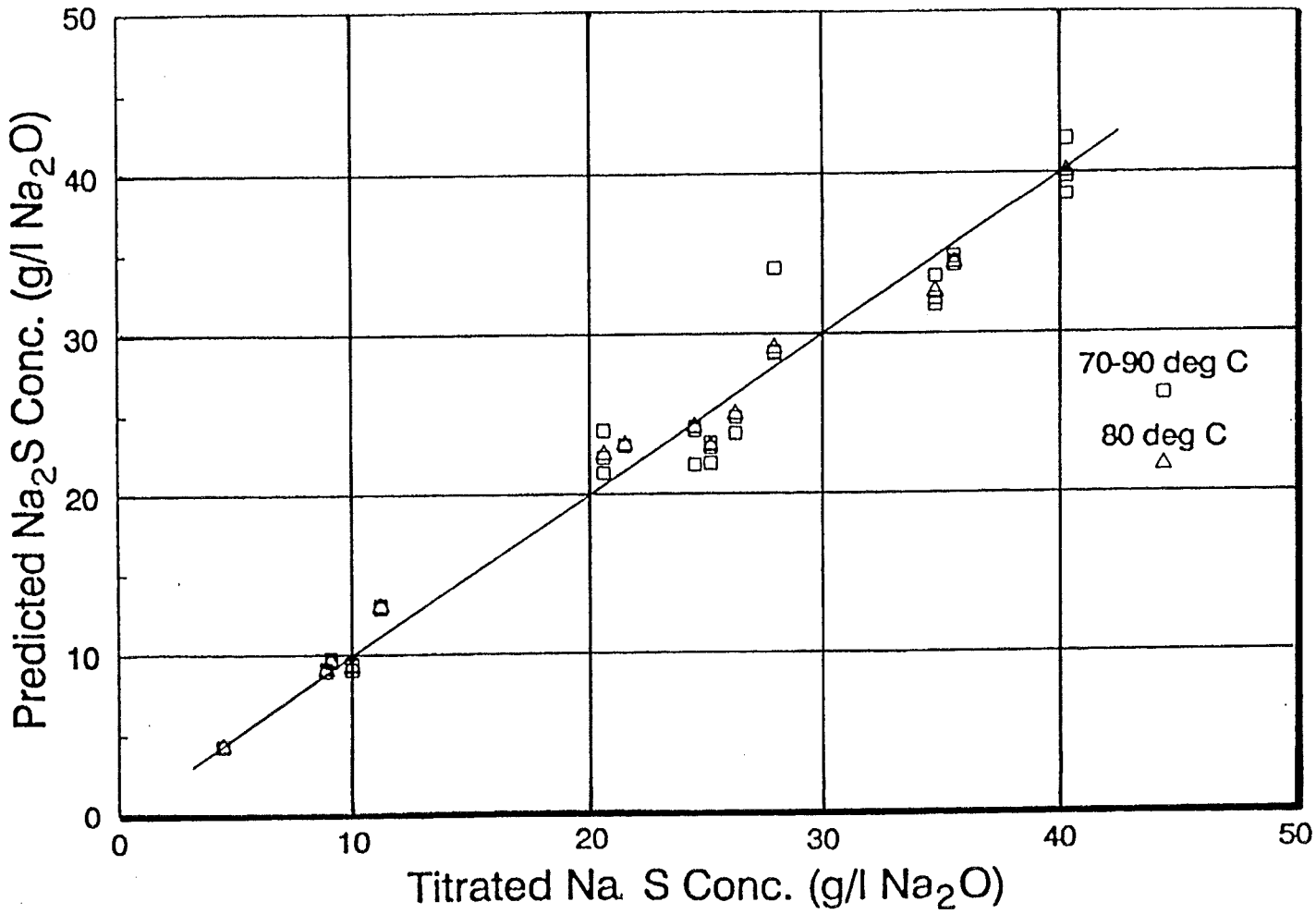
FIG. 6 is a graphical view of a comparison between the titrated and predicted sodium sulfide concentrations for the analyzer of FIG. 5 for white liquor-type solutions.

The prediction ability of the sulfide electrode is shown in FIG. 6. The error at 80° C. expressed as a 90% confidence interval is approximately ±2.3 g/l, while that over 70°-90° C. is nearly ±3 g/l. Both errors are substantial.

The regressions involving sodium hydroxide and sodium carbonate were carried out for three different cases. In the first case, the sodium sulfide concentration was assumed to be known with accuracy corresponding to that of the liquor titration. The second case involved regression of the data at 80° C. using equation (17) for sulfide prediction. The third case was a regression of all data using equation (18) for sulfide prediction. The equation form determined by stepwise regression to be optimum was:

$$OH \text{ or } CO_3 = a + b\,D_r + C\,C_r + d\,D_r^2 + e\,C_r^2 + f\,S \qquad (19)$$

The regression coefficients for both NaOH and $Na_2CO_3$ in all three cases are shown in Table 8. The coefficients are of the same order of magnitude for each case, reflecting the reasonable fit of the sulfide data as compared to the known values. The accuracy of the predictions as 90% confidence intervals for each component are shown for each case in Table 9.

TABLE 8

| Case | a | b | c × $10^{-2}$ | d × $10^{-3}$ | e × $10^{-4}$ | f × $10^{-1}$ |
|---|---|---|---|---|---|---|
| | | Regression Coefficients for NaOH and $Na_2CO_3$ Prediction Using the In-situ Liquor Analyzer | | | | |
| | | | Sodium Hydroxide | | | |
| 1 | 2851.68 | −5.2877 | −3.1845 | 2.4756 | 1.3644 | −5.7230 |
| 2 | 2310.31 | −4.2876 | −9.0360 | 2.0341 | 1.7289 | −6.2667 |
| 3 | 2459.77 | −4.5606 | −7.0792 | 2.1521 | 1.6000 | −5.9363 |
| | | | Sodium Carbonate | | | |
| 1 | −2546.63 | 4.1842 | −2.4066 | −1.6334 | −7.3141 | −2.6597 |
| 2 | −2595.08 | 4.2732 | −3.1885 | −1.6707 | −6.9820 | −2.7991 |
| 3 | −2733.89 | 4.5340 | −4.3062 | −1.7902 | −6.1359 | −2.7077 |

TABLE 9

| Case | NaOH | $Na_2S$ | $Na_2CO_3$ |
|---|---|---|---|
| | Prediction Errors (g/l) for White Liquor Using the In-situ Liquor Analyzer | | |
| 1 | 0.58 | — | 0.51 |
| 2 | 0.97 | 2.30 | 0.71 |
| 3 | 1.61 | 2.98 | 1.17 |

Figure 7:
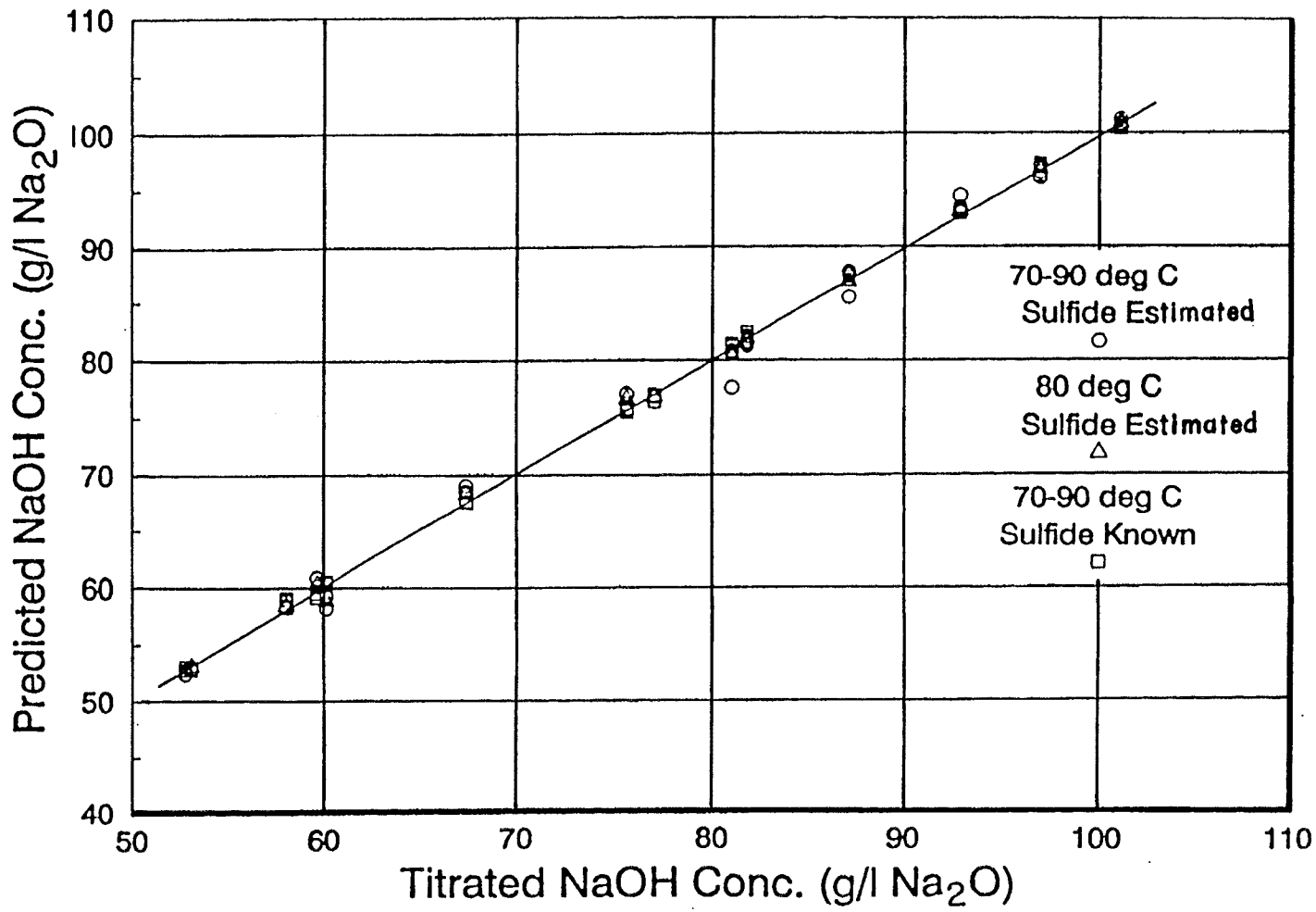
FIG. 7 is a graphical view of the comparison between titrated and predicted sodium hydroxide concentrations for the analyzer of FIG. 5 for white liquor-type solutions.
Figure 8:
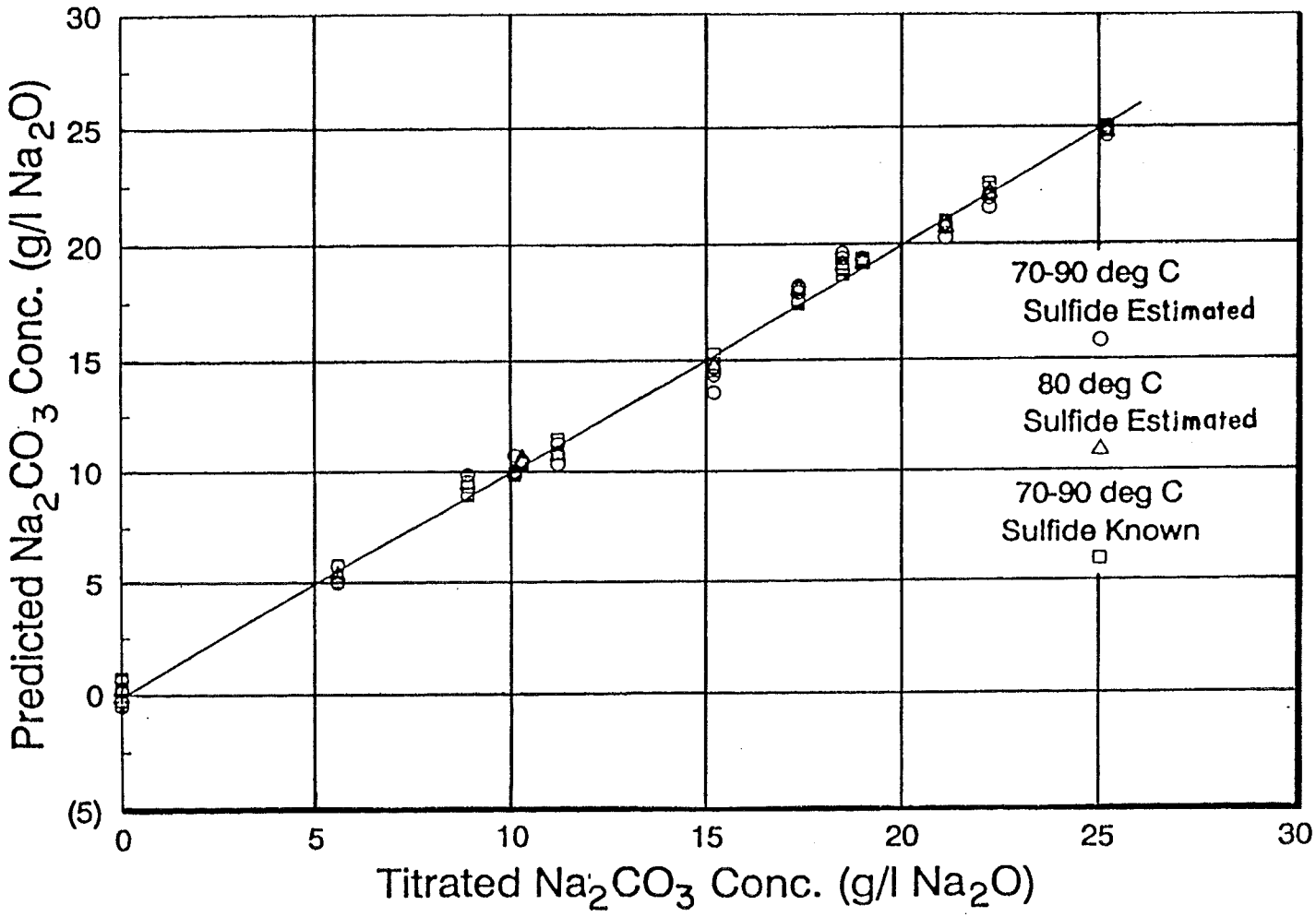
FIG. 8 is a graphical view of the comparison between of the titrated and predicted sodium carbonate concentrations for the analyzer of FIG. 5 for white liquor-type solutions.

It is clear that the prediction ability is excellent if the sulfide concentration is known. The errors in this case are significantly less than 1 g/l over the entire temperature range. The large error in sulfide prediction clearly degrades the other predictions. Simulation was used to examine the effect of a smaller sulfide error on the prediction of sodium hydroxide and sodium carbonate. The sulfide error was represented by a normal distribution N(0,0.25). This distribution produces a sulfide error of approximately 1 g/l at 95% confidence. Trials using the correlations obtained for case 1 indicate that the errors in NaOH and $Na_2CO_3$ prediction would not be inflated significantly at this level of sulfide error. Thus, if a more accurate detector for sulfide detection was available, the in-situ analyzer should perform as well as the extractive sample analyzer with white liquor. The results for all three cases are shown in FIGS. 7 and 8.

A similar set of experiments was run for green liquor type solutions. In this case, 12 experiments were run to establish correlations.

The procedure for data regression parallels that of the white liquor. Examination of the data indicated that the temperature effect on both density and conductivity was linear and the slope was dependent on the reference density. The equation for density temperature compensation is:

$$D_r = \frac{-b + \sqrt{(b^2 - 4ac)}}{2a} \qquad (20)$$

where a=m (T−80)

b=n (T−80)+1 c=$-D_T$ m=$1.0274\times10^{-6}$ n=$1.6784\times10^{-3}$

The equation for conductivity temperature compensation is:

$$C_r = \frac{C_T}{[m\,D_r + n](T - 80) + 1} \qquad (21)$$

where

T=Temperature (C)

$C_T$=conductivity at temperature T (mS/cm)

$C_r$=conductivity at reference temperature (mS/cm)

m=$1.4798\times10^{-5}$ n=$-5.8621\times10^{-3}$

The sulfide electrode response was regressed as an exponential correlation at 80° C. and the best fit equation is:

$$\ln(S) = -21.1551 + 3.6220\times10^{-2}\,V - 5.8771\times10^{-3}\,D_r \qquad (22)$$

where s=sodium sulfide concentration (g/l $Na_2O$)

V=sulfide electrode voltage (−mV)

$D_r$=reference density (mS/cm)

Equation (22) is similar to equation (17) for white liquor. However, the ionic strength correction in this case is density rather than conductivity. This dependence reflects the effect of sodium carbonate, the primary green liquor component, on density elevation rather than conductivity elevation. The standard deviation of the prediction with equation (22) is 2.54 g/l, resulting in a 90% confidence interval of ±4.60 g/l for sodium sulfide.

The regressions for sodium hydroxide and sodium carbonate were carried out for two cases. First, the sulfide concentration was assumed to be known with titration accuracy. Second, the data at 80° C. was used with equation (22) for sulfide prediction. Equation (19) was found to best represent the sensor response to the green liquor solutions. The regression coefficients for both NaOH and $Na_2CO_3$ in both cases are shown in Table 10. The accuracy of the predictions as 90% confidence intervals for each component are shown for each case in Table 11.

TABLE 10

Regression Coefficients for NaOH and $Na_2CO_3$ Prediction Using the In-situ Liquor Analyzer on Green Liquor

| Case | a | b | $c \times 10^{-1}$ | $d \times 10^{-3}$ | $e \times 10^{-5}$ | $f \times 10^{-1}$ |
|---|---|---|---|---|---|---|
| Sodium Hydroxide | | | | | | |
| 1 | 2608.90 | −4.6430 | 1.3885 | 2.0328 | 7.6224 | −6.8430 |
| 2 | 2056.60 | −3.7289 | 2.2489 | 1.6464 | −6.0929 | −6.1485 |
| Sodium Carbonate | | | | | | |
| Case | a | b | $c \times 10^{-2}$ | $d \times 10^{-4}$ | $e \times 10^{-5}$ | $f \times 10^{-1}$ |
| 1 | −1738.50 | 2.5331 | −9.8034 | −7.7130 | −7.6584 | −2.0122 |
| 2 | −1958.50 | 2.9015 | −7.0751 | −9.2809 | −1.0923 | −2.7331 |

TABLE 11

Prediction Errors for Green Liquor Using the In-situ Liquor Analyzer

| Case | NaOH | $Na_2S$ | $Na_2CO_3$ |
|---|---|---|---|
| 1 | 0.66 | — | 0.61 |
| 2 | 2.70 | 4.60 | 0.94 |

Figure 9:
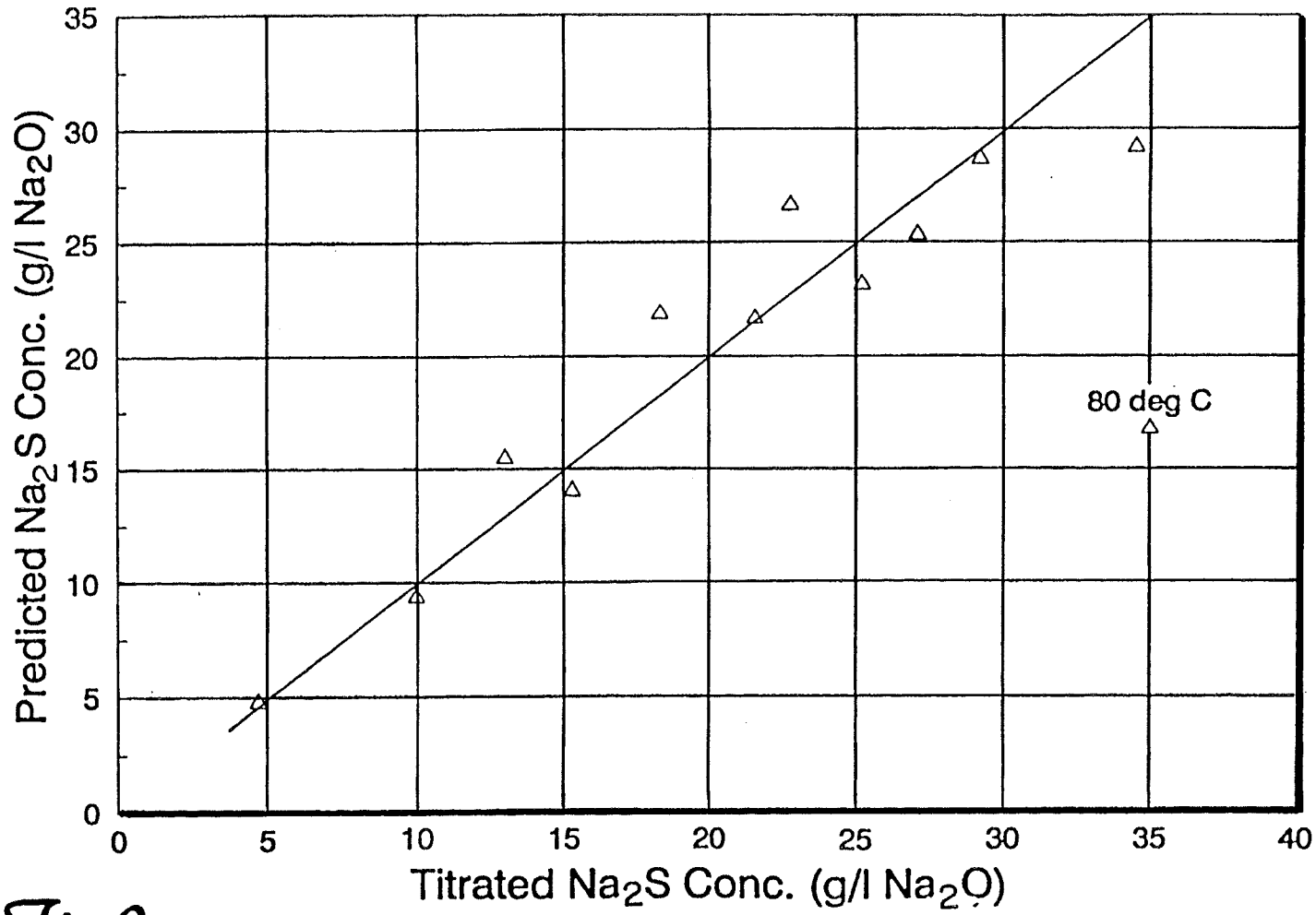
FIG. 9 is a graphical view of the comparison between the titrated and predicted sodium sulfide concentrations for the analyzer of FIG. 5 for green liquor-type solutions.
Figure 10:
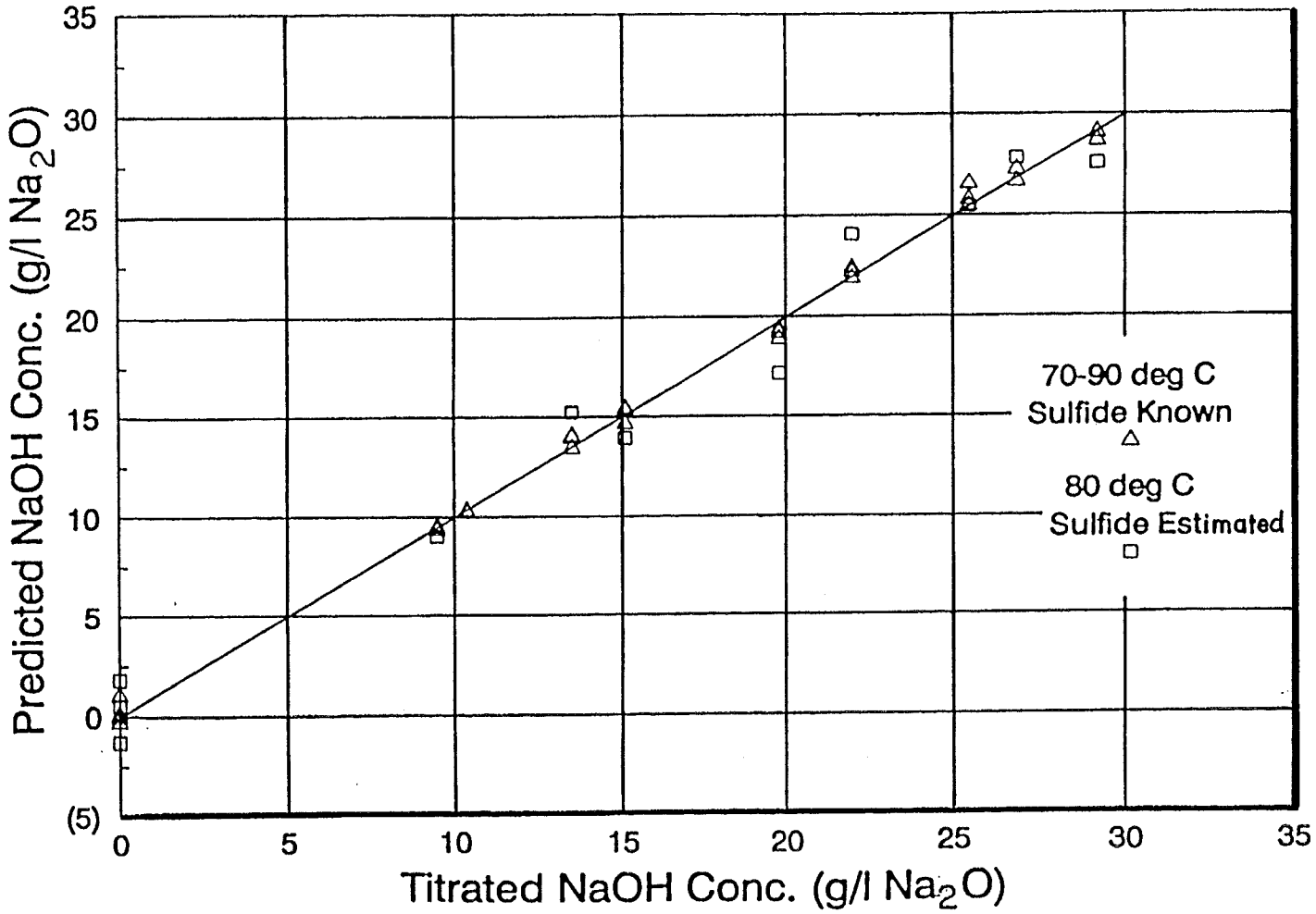
FIG. 10 is a graphical view of the comparison between the titrated and predicted sodium hydroxide concentrations for the analyzer of FIG. 5 for green liquor-type solutions.
Figure 11:
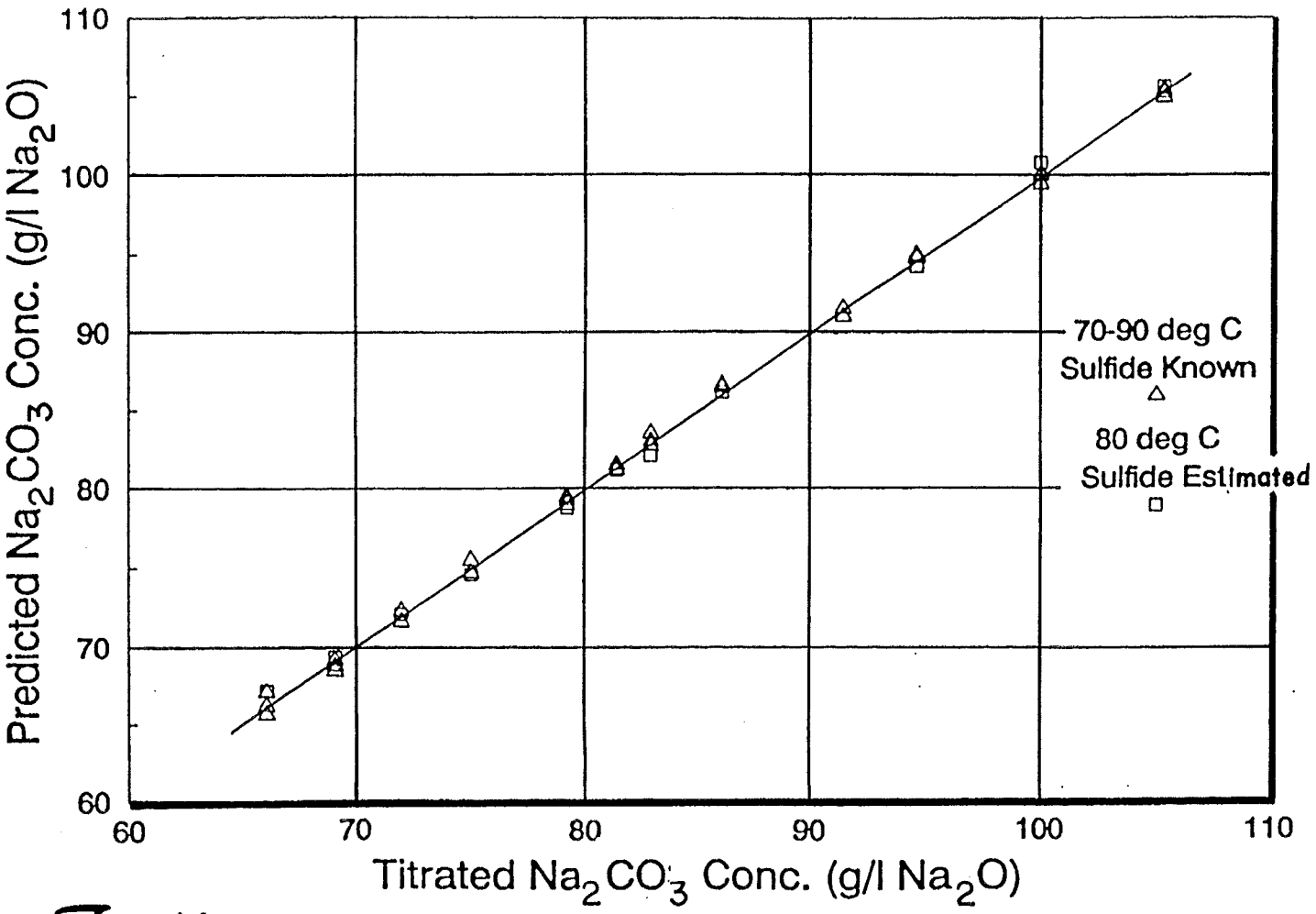
FIG. 11 is a graphical view of the comparison between the titrated and predicted sodium carbonate concentrations for the analyzer of FIG. 5 for green liquor-type solutions.

As with white liquor, the prediction ability is excellent if the sulfide concentration is known. However, due to the presently available sulfide electrode, the sulfide predictions adversely effect the NaOH and $Na_2CO_3$ predictions when the correlation is used. If the sodium sulfide measurement could be made with accuracy of ±1.0 g/l or better, then sodium hydroxide and sodium carbonate measurements would be within 90% confidence intervals of ±0.7 g/l. Mathematical manipulation of sodium sulfide data shows this to be true. The $Na_2S$ prediction results are shown in FIG. 9. The results for NaOH and $Na_2CO_3$ are shown in FIGS. 10 and 11.

SUMMARY

The novel extractive sample liquor analyzer of the present invention has the ability to analyze kraft white and green liquor samples for sodium hydroxide, sodium sulfide, and sodium carbonate concentrations with accuracy comparable to titration. The in-situ liquor analyzer also has comparable accuracy if a reliable sulfide electrode that can withstand the continuous hostile environment is developed. The design of both types of analyzers permits handling of other pulp mill liquors based on the same components such as soda, soda-AQ, neutral and alkaline sulfite, and controlled alkali semi-chemical liquors. It will be further understood that the analyzer of this invention may be used in processes other than paper pulping processes.

Figure 12:
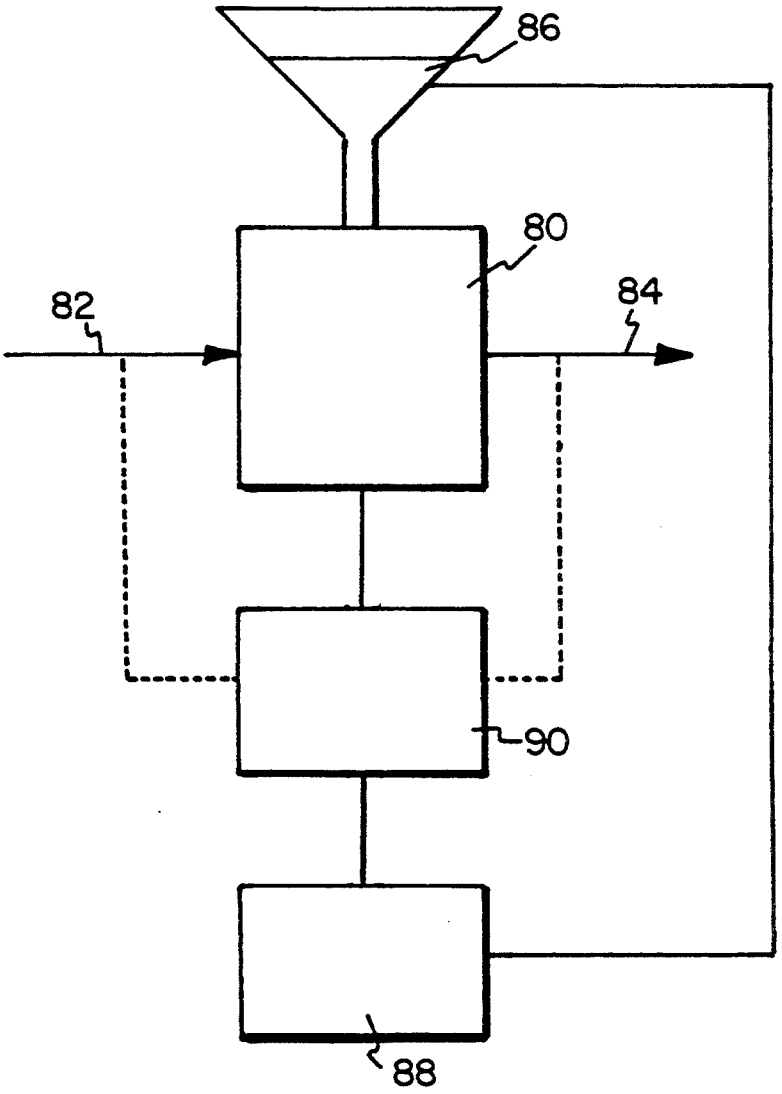
FIG. 12 is a diagrammatical view of one example of a control system using the analyzer of the present invention.

The liquor analyzer of the present invention is suitable for use in both feed forward and feed back control systems. Many types of control systems can be configured to help control the concentration of the green liquor in a kraft paper process. One simple control system is illustrated in FIG. 12. Control for a causticizer 80 includes analysis of the green liquor stream 82 entering the causticizer and the liquor stream 84 exiting the causticizer. The addition of lime 86 is regulated by a computer control system 88 which uses the data received from detectors 90.

The minimum analysis time for the extractive sample liquor analyzer is approximately three minutes. The 90% confidence intervals for white and green liquors are approximately ±0.5 g/l for sodium hydroxide and sodium sulfide, and ±0.8 g/l for sodium carbonate expressed as equivalents of $Na_2O$.

The analyzer of this invention has features which make it advantageous as compared to current types of analysis. One advantage is speed. The time for analysis is approximately three minutes. This is significantly faster than automatic titrators or ion chromatography. Another advantage is that a minimal amount of maintenance is required. There is no sensitive chromatography column that must be periodically regenerated or replaced. There are no chemical reagents required that must be prepared and standardized. The accuracy of analysis is also good over a wide range of operating conditions.

The in-situ liquor analyzer, specifically the conductivity and density portion, has the advantages of continuous liquor monitoring and simplicity of design. The question of temperature compensation has been answered, and the accuracy could be comparable to that of the extractive sample analyzer once a sulfide electrode is developed to withstand the harsh environment for an extended period of time.

Although the present invention has been described with reference to preferred embodiments, workers skilled in the art will recognize that changes may be made in form and detail without departing from the spirit and scope of the invention.

What is claimed is:

1. An apparatus for detecting a concentration of each of at least three components in a homogenous solution, the apparatus comprising:

detecting means for detecting three different characteristics of each of the three components and for providing a respective signal that is representative of the magnitude of the characteristics of each of the three components in solutions;

computing means for receiving and storing each of said signals provided by the detecting means, the computing means being in signal receiving relationship with the detecting means; and a mathematical expression employed in the computing means that relates the three different characteristics detected by the detecting means to the concentration of each of the at least three components in the homogenous solution such that the mathematical expression includes at least three equations solve simultaneously, each equation including each of the three characteristics as independent variables, and each equation solving for the concentration of one of the components.

2. The apparatus of claim 1 wherein the detecting means includes a conductivity detector, a density detector, and a sulfide ion concentration detector.

3. The apparatus of claim 1 wherein the detecting means includes a UV absorption detector, a conductivity detector, and a refractive index detector.

4. The apparatus of claim 1 and further including valving means and conduit means for extracting a single sample of solution which passes through the detecting means.

5. The apparatus of claim 1 and further including valving means and conduit means for obtaining a continuous sample of the solution which passes through the detecting means.

6. The apparatus of claim 1 and further including control means for controlling the relative concentration of each of the three components by utilizing the information characteristic of the concentration of each of the components.

* * * * *